US012350556B2

(12) United States Patent
Park

(10) Patent No.: US 12,350,556 B2
(45) Date of Patent: Jul. 8, 2025

(54) NEGATIVE POISSON'S RATIO MATERIALS FOR RACQUETS AND GOLF TEES

(71) Applicant: Joon Bu Park, Huntington Beach, CA (US)

(72) Inventor: Joon Bu Park, Huntington Beach, CA (US)

(*) Notice: Subject to any disclaimer, the term of this patent is extended or adjusted under 35 U.S.C. 154(b) by 0 days.

(21) Appl. No.: 17/493,350

(22) Filed: Oct. 4, 2021

(65) Prior Publication Data
US 2023/0105842 A1 Apr. 6, 2023

(51) Int. Cl.
| A63B 49/10 | (2015.01) |
| A63B 49/12 | (2015.01) |
| A63B 51/16 | (2006.01) |
| A63B 57/13 | (2015.01) |
| A63B 57/15 | (2015.01) |
| B33Y 70/00 | (2020.01) |
| B33Y 80/00 | (2015.01) |
| A63B 102/02 | (2015.01) |
| A63B 102/04 | (2015.01) |
| A63B 102/06 | (2015.01) |

(52) U.S. Cl.
CPC .............. *A63B 49/10* (2013.01); *A63B 49/12* (2013.01); *A63B 51/16* (2015.10); *A63B 57/13* (2015.10); *A63B 57/15* (2015.10); *B33Y 70/00* (2014.12); *B33Y 80/00* (2014.12); *A63B 2102/02* (2015.10); *A63B 2102/04* (2015.10); *A63B 2102/06* (2015.10); *A63B 2209/08* (2013.01)

(58) Field of Classification Search
CPC ......... A63B 49/00; A63B 49/02; A63B 49/10; A63B 49/12; A63B 49/14; B33Y 70/00; B33Y 80/00
See application file for complete search history.

(56) References Cited

U.S. PATENT DOCUMENTS

| 6,447,412 B1 * | 9/2002 | Filippini ................ A63B 60/48 473/524 |
| 7,598,651 B2 | 10/2009 | Kornbluh et al. |
| (Continued) | | |

FOREIGN PATENT DOCUMENTS

WO    WO-9400203 A1 *   1/1994   ............. A63B 49/02

OTHER PUBLICATIONS

Head, "Auxetic—The Science Behind the Sensational Feel", Sep. 2021 (Year: 2021).*

(Continued)

*Primary Examiner* — Joshua T Kennedy
(74) *Attorney, Agent, or Firm* — Fish & Richardson P.C.

(57) ABSTRACT

A racquet includes a handle; and a frame connected to an end of the handle, the frame defining a rounded interior space, the frame including a negative Poisson's ratio (NPR) foam material, in which the NPR foam material, and in which the frame has a Poisson's ratio of between 0 and −1; and a network of strings stretched across the rounded interior space defined by the frame. A golf tee includes an elongated stem; and a head disposed at an end of the elongated stem and shaped to receive a golf ball; in which at least a portion of the golf tee is formed of a negative Poisson's ratio (NPR) foam material, in which the portion of the golf tee has a Poisson's ratio of between 0 and −1, and in which the NPR foam material includes an NPR metal foam, an NPR ceramic foam, or an NPR-PPR composite foam.

25 Claims, 12 Drawing Sheets

(56) References Cited

U.S. PATENT DOCUMENTS

| | | | |
|---|---|---|---|
| 7,598,652 B2 | 10/2009 | Kornbluh et al. | |
| 8,164,232 B2 | 4/2012 | Kornbluh et al. | |
| 8,436,508 B2 | 5/2013 | Kornbluh et al. | |
| 10,500,447 B2 | 12/2019 | Sheng | |
| 2009/0127801 A1* | 5/2009 | Heikkila | A01K 95/005 168/4 |
| 2010/0119792 A1* | 5/2010 | Ma | A47C 23/002 428/218 |
| 2012/0021167 A1* | 1/2012 | Plant | F16F 7/122 428/116 |
| 2013/0328440 A1 | 12/2013 | Kornbluh et al. | |
| 2016/0346626 A1* | 12/2016 | Nürnberg | A63B 43/00 |
| 2017/0009036 A1* | 1/2017 | Xie | B33Y 80/00 |
| 2017/0105478 A1 | 4/2017 | Cross et al. | |
| 2017/0291076 A1* | 10/2017 | Campbell | A63B 43/008 |

OTHER PUBLICATIONS

Applied Sciences, "Review of Auxetic Materials for Sports Applications: Expanding Options in Comfort and Protection", Duncan et al, Jun. 2018 (Year: 2018).*
Nava-Gomez et al; "Elastic properties of an orthotropic binary fiber-reinforced composite with auxetic and conventional constituents"; May 2012 (Year: 2012).*
International Search Report and Written Opinion in International Appln. No. PCT/US2022/077275, mailed Feb. 2, 2023, 15 pages.

\* cited by examiner

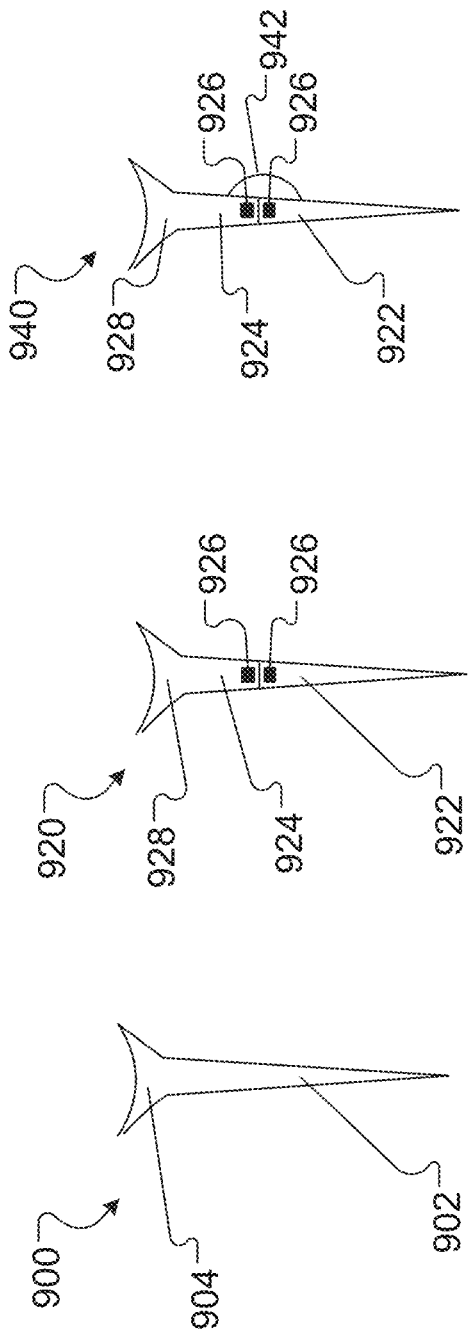

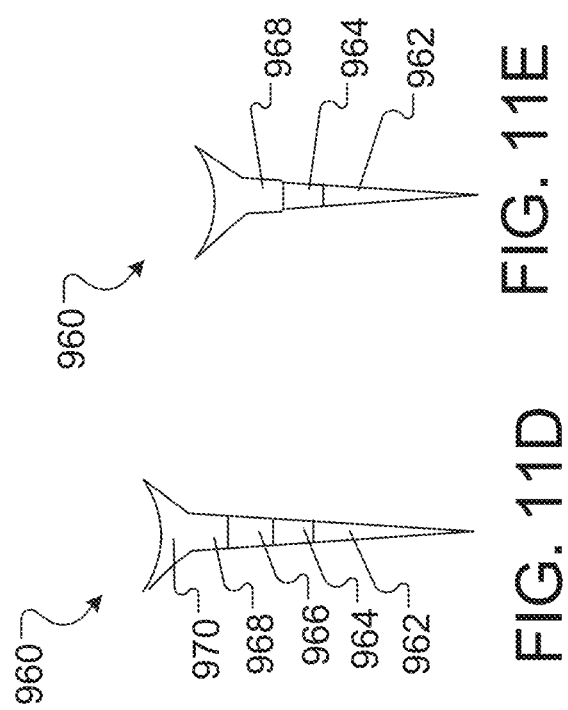

NEGATIVE POISSON'S RATIO MATERIALS FOR RACQUETS AND GOLF TEES

BACKGROUND

The present disclosure relates generally to materials for and construction of various types of racquets, such as tennis racquets, badminton racquets, squash racquets, etc. Additionally, the present disclosure relates generally to materials for and construction of golf tees.

Racquets are used for various sporting and leisure activities that are played and watched by a large portion of the population.

SUMMARY

We describe here racquets, such as tennis racquets, that are formed of materials having a negative Poisson's ratio ("NPR materials"). For instance, the frame of a tennis racquet can be formed of an NPR material. This composition facilitates efficient energy transfer from a racquet to the ball, thereby enabling the ball to be launched a long distance upon impact by the racquet. In some examples, racquets can be formed of composite materials that include both NPR materials and materials with positive Poisson's ratios ("PPR materials") to achieve desired performance characteristics.

In an aspect, a racquet includes a handle; and a frame connected to an end of the handle, the frame defining a rounded interior space, the frame including a negative Poisson's ratio (NPR) foam material, in which the frame has a Poisson's ratio of between 0 and −1; and a network of strings stretched across the rounded interior space defined by the frame.

Embodiments can include one or any combination of two or more of the following features.

The NPR foam material includes an NPR polymer foam. In some cases, the NPR polymer foam includes an NPR rubber foam. In some cases, the NPR polymer foam material includes a thermoplastic polymer NPR foam or a viscoelastic elastomer NPR foam.

The NPR foam material includes an NPR metal foam.

The frame has a Poisson's ratio of between 0 and −0.8.

The NPR foam material is composed of a cellular structure having a characteristic dimension of between 0.1 μm and 3 mm.

The frame includes a composite material including the NPR foam material and a positive Poisson's ratio (PPR) material.

The strings include a second NPR foam material.

The racquet includes a tennis racquet or squash racquet.

The racquet includes a badminton racquet.

Dimples are defined on the frame of the racquet.

In an aspect, a method of making a racquet includes forming a frame of a racquet from a negative Poisson's ratio (NPR) foam material, in which the frame has a Poisson's ratio of between 0 and −1, the forming including forming the frame to define a rounded interior space; and stretching a network of strings across the rounded interior space defined by the frame, in which the frame is connected to an end of a handle of the racquet.

Embodiments can include one or any combination of two or more of the following features.

Forming the frame from an NPR material includes heating and compressing a positive Poisson's ratio (PPR) foam material to form the NPR material.

Forming the frame from an NPR material includes forming the frame from nano- or micro-structured PPR materials.

Forming the frame from an NPR material includes forming the frame using an additive manufacturing technique.

In an aspect, a golf tee includes an elongated stem; and a head disposed at an end of the elongated stem and shaped to receive a golf ball; in which at least a portion of the golf tee is formed of a negative Poisson's ratio (NPR) foam material, in which the portion of the golf tee has a Poisson's ratio of between 0 and −1, and in which the NPR foam material includes an NPR metal foam, an NPR ceramic foam, or an NPR-PPR composite foam.

Embodiments can include one or any combination of two or more of the following features.

The head is formed of an NPR metal foam, an NPR ceramic foam, or an NPR-PPR composite foam.

The stem is formed of an NPR metal foam, an NPR ceramic foam, or an NPR-PPR composite foam.

The elongated stem is formed of multiple pieces. In some cases, the golf tee includes a magnet disposed in each of the multiple pieces, in which the magnets are configured to hold the multiple pieces together. In some cases, the golf tee includes string connecting the multiple pieces of the elongated stem together. In some cases, the multiple pieces of the elongated stem are telescopic so that the length of the elongated stem is adjustable. In an aspect, a racquet includes a handle; and a frame connected to an end of the handle, the frame defining a rounded interior space, the frame including a negative Poisson's ratio (NPR) foam material, in which the NPR foam material, and in which the frame has a Poisson's ratio of between 0 and −1; and a network of strings stretched across the rounded interior space defined by the frame.

Embodiments can include one or any combination of two or more of the following features.

The NPR foam material includes an NPR polymer foam. In some cases, the NPR polymer foam includes an NPR rubber foam. In some cases, the NPR polymer foam material includes a thermoplastic polymer NPR foam or a viscoelastic elastomer NPR foam.

The NPR foam material includes an NPR metal foam.

The frame has a Poisson's ratio of between 0 and −0.8.

The NPR foam material is composed of a cellular structure having a characteristic dimension of between 0.1 μm and 3 mm.

The frame includes a composite material including the NPR foam material and a positive Poisson's ratio (PPR) material.

The strings include a second NPR foam material.

The racquet includes a tennis racquet or squash racquet.

The racquet includes a badminton racquet.

Dimples are defined on the frame of the racquet.

In an aspect, a method of making a racquet includes forming a frame of a racquet from a negative Poisson's ratio (NPR) foam material, in which the NPR foam material includes an NPR foam, and in which the frame has a Poisson's ratio of between 0 and −1, the forming including forming the frame to define a rounded interior space; and stretching a network of strings across the rounded interior space defined by the frame, in which the frame is connected to an end of a handle of the racquet.

Embodiments can include one or any combination of two or more of the following features.

Forming the frame from an NPR material includes heating and compressing a positive Poisson's ratio (PPR) foam material to form the NPR material.

Forming the frame from an NPR material includes forming the frame from nano- or micro-structured PPR materials.

Forming the frame from an NPR material includes forming the frame using an additive manufacturing technique.

In an aspect, a golf tee includes an elongated stem; and a head disposed at an end of the elongated stem and shaped to receive a golf ball; in which at least a portion of the golf tee is formed of a negative Poisson's ratio (NPR) foam material, in which the portion of the golf tee has a Poisson's ratio of between 0 and −1, and in which the NPR foam material includes an NPR metal foam, an NPR ceramic foam, or an NPR-PPR composite foam.

Embodiments can include one or any combination of two or more of the following features.

The head is formed of an NPR metal foam, an NPR ceramic foam, or an NPR-PPR composite foam.

The stem is formed of an NPR metal foam, an NPR ceramic foam, or an NPR-PPR composite foam.

The elongated stem is formed of multiple pieces. In some cases, the golf tee includes a magnet disposed in each of the multiple pieces, in which the magnets are configured to hold the multiple pieces together. In some cases, the golf tee includes string connecting the multiple pieces of the elongated stem together. In some cases, the multiple pieces of the elongated stem are telescopic so that the length of the elongated stem is adjustable.

Other implementations are within the scope of the claims.

DESCRIPTION OF DRAWINGS

FIGS. 11A-11E are diagrams of golf tees.

DETAILED DESCRIPTION

Figure 1:
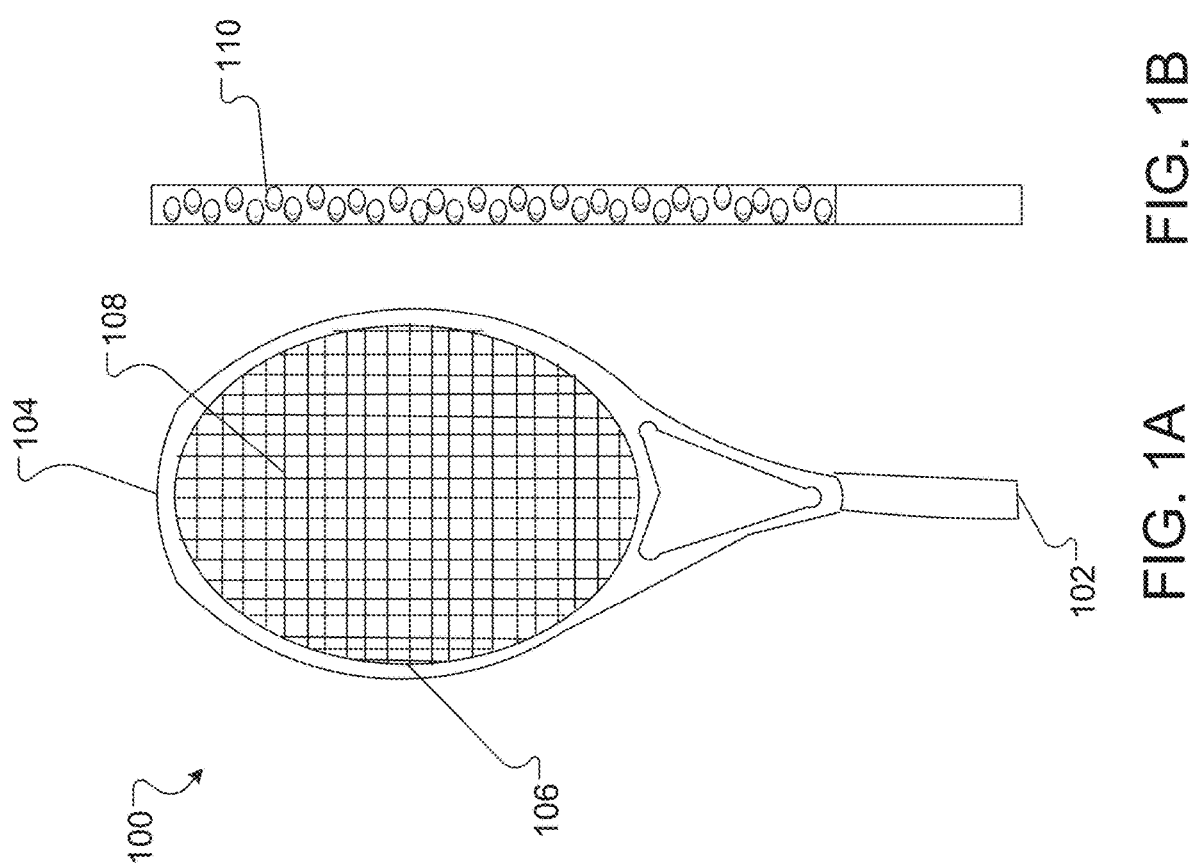
FIGS. 1A and 1B are diagrams of a tennis racquet.

We describe here racquets, such as tennis racquets, ping pong paddles, badminton racquets, or squash racquets, that are formed of materials having a negative Poisson's ratio ("NPR materials"). For instance, the frame of a tennis racquet can be formed of an NPR material. This construction facilitates efficient energy transfer from the racquet to the ball, thereby enabling the ball to be launched a long distance upon impact by the racquet. In some examples, racquets are formed of composite materials that include both NPR materials and materials with positive Poisson's ratios ("PPR materials") to achieve target performance characteristics, such as aerodynamic properties (e.g., launch distance) or durability.

FIGS. 1A and 1B illustrate a front view and a side view, respectively, of a tennis racquet 100 that includes NPR materials. The tennis racquet 100 includes a handle 102 that can be held in the hand of a user. An end of the handle 102 is connected to a frame 104. In some examples, the handle 102 and frame 104 are two distinct pieces that are attached together. In some examples, the handle 102 and frame 104 are formed of a single, unitary piece of material. Tennis racquets come in a variety of sizes (e.g., about 19 inches in length to about 27 inches in length). For instance, some standard tennis racquets for adults are about 27 inches in length.

The frame 104 defines an interior space 106. The interior space 106 is generally rounded, e.g., circular, elliptical, etc. The interior space 106 contains a network of strings 108, which are stretched across the rounded interior space 106. The number of strings 108 stretched across the interior space 106 can vary (e.g., about 280 strings to about 360 strings). The strings 108 make contact with a tennis ball during a game of tennis, and are stretched across the interior space 106 tightly to provide an elastic strike.

One or more parts of the racquet 100, such as the frame 104, the handle 102, or the strings 108, include a material with a negative Poisson's ratio (referred to as an "NPR material" or an "auxetic material"), such as an NPR foam material, e.g., an NPR polymer foam an NPR metal foam, or an NPR ceramic foam. As a result, the frame 104, handle 102, and/or strings 108 have a Poisson's ratio of between 0 and −1, e.g., between 0 and −0.8.

The frame 104, handle 102, or strings 108 can be exclusively NPR material, or can be an NPR-PPR composite material, or can have portions formed of NPR material and portions formed of PPR material. For instance, the frame 104 can include, e.g., graphite, plastic, fiberglass, in addition to or instead of an NPR material. The strings 108 can be include, e.g., nylon, polyester, in addition to or instead of an NPR material. The handle 102 can include, e.g., sponge, rubber, cork, in addition to or instead of an NPR material. The presence of NPR material in the frame 104, handle 102, or strings 108 can contribute to target performance characteristics, such as launch distance. The presence of NPR material in the handle 102 can also provide a comfortable grip.

The NPR foam material used for the frame 104, handle 102, and/or strings 108 can be an NPR rubber foam, such as a foam composed of butadiene, polybutadiene, or styrene-butadiene. The NPR foam material used for the frame 104, handle 102, and/or strings 108 can be an NPR thermoplastic polymer foams (e.g., polyester polyurethane or polyether polyurethane); an NPR viscoelastic elastomer foam; or an NPR thermosetting polymer foam such as silicone rubber. Examples of NPR metal foams for racquets include NPR metal foams based on copper, aluminum, or other metals, or alloys thereof. In some examples, the frame 104, handle 102, and/or strings 108 are composed of an NPR composite material including both an NPR foam material and a PPR material. Composite NPR materials are discussed further below.

In some examples, fewer than all of the frame 104, the handle 102, and the strings 108 include an NPR material. When multiple racquet components are formed of an NPR material, the same material is not necessarily used for all components. For instance, the frame 104 can include a first type of NPR foam material, the strings 108 can include a second type of NPR foam material, and the handle 102 can be a PPR material.

An NPR material is a material that has a Poisson's ratio that is less than zero, such that when the material experiences a positive strain along one axis (e.g., when the material is stretched), the strain in the material along the two perpendicular axes is also positive (e.g., the material expands in cross-section). Conversely, when the material experiences a negative strain along one axis (e.g., when the material is compressed), the strain in the material along a perpendicular axis is also negative (e.g., the material compresses along the perpendicular axis). By contrast, a material with a positive Poisson's ratio (a "PPR material") has a Poisson's ratio that is greater than zero. When a PPR material experiences a positive strain along one axis (e.g., when the material is stretched), the strain in the material along the two perpendicular axes is negative (e.g., the material compresses in cross-section), and vice versa.

Figure 2:
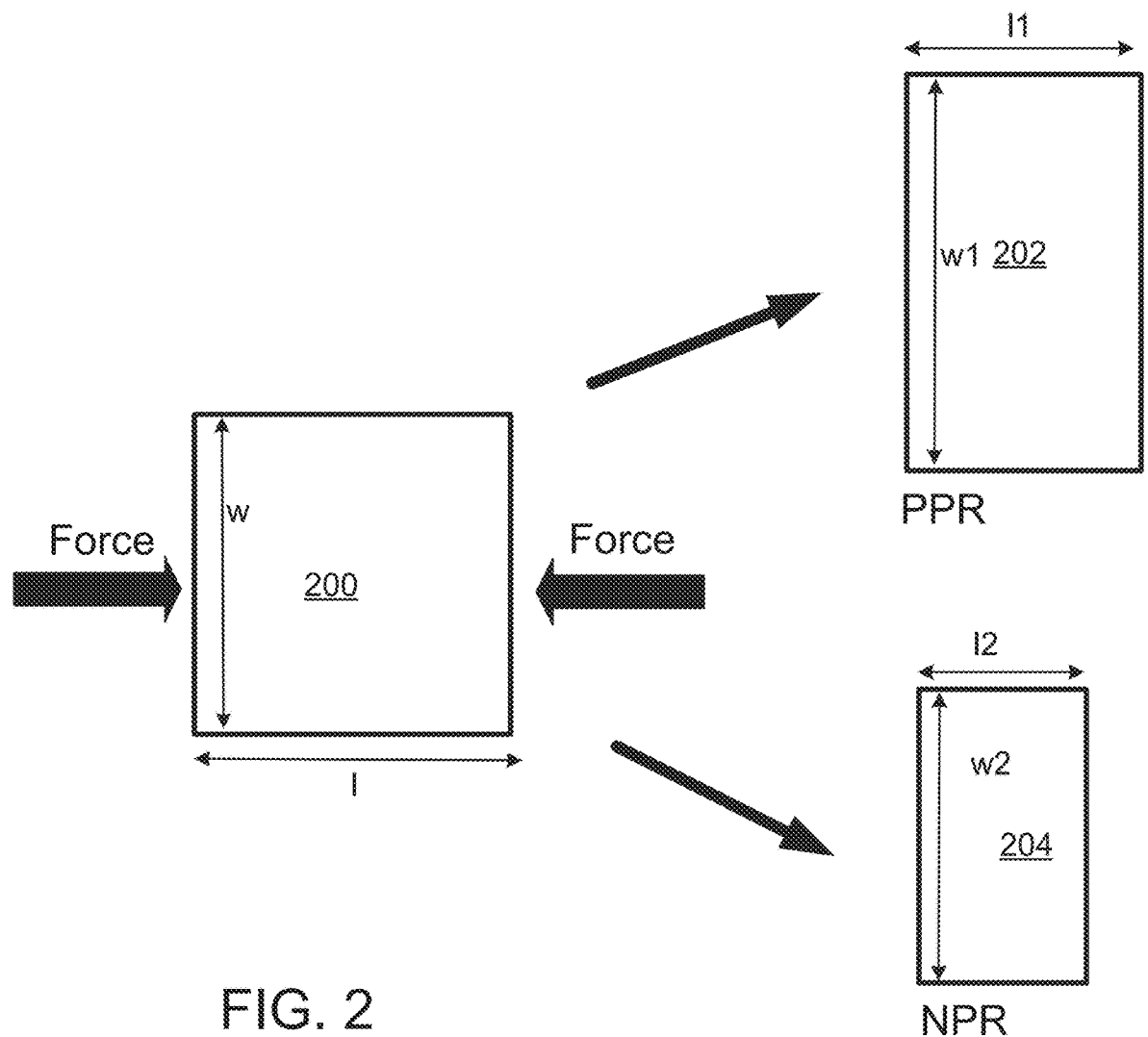
FIG. 2 is an illustration of materials with negative and positive Poisson's ratios.

Materials with negative and positive Poisson's ratios are illustrated in FIG. 2, which depicts a hypothetical two-dimensional block of material 200 with length l and width w.

If the hypothetical block of material 200 is a PPR material, when the block of material 200 is compressed along its width w, the material deforms into the shape shown as block 202. The width w1 of block 202 is less than the width w of block 200, and the length l1 of block 202 is greater than the length l of block 200: the material compresses along its width and expands along its length.

By contrast, if the hypothetical block of material 200 is an NPR material, when the block of material 200 is compressed along its width w, the material deforms into the shape shown as block 204. Both the width w2 and the length l2 of block 204 are less than the width w and length l, respectively, of block 200: the material compresses along both its width and its length.

NPR materials for racquets can be foams, such as polymeric foams, ceramic foams, metal foams, or combinations thereof. A foam is a multi-phase composite material in which one phase is gaseous and the one or more other phases are solid (e.g., polymeric, ceramic, or metal). Foams can be closed-cell foams, in which each gaseous cell is sealed by solid material; open-cell foams, in which the each cell communicates with the outside atmosphere; or mixed, in which some cells are closed and some cells are open.

An example of an NPR foam structure is a re-entrant structure, which is a foam in which the walls of the cells are concave, e.g., protruding inwards toward the interior of the cells. In a re-entrant foam, compression applied to opposing walls of a cell will cause the four other, inwardly directed walls of the cell to buckle inward further, causing the material in cross-section to compress, such that a compression occurs in all directions. Similarly, tension applied to opposing walls of a cell will cause the four inwardly directed walls of the cell to unfold, causing the material in cross-section to expand, such that expansion occurs in all directions. NPR foams can have a Poisson's ratio of between −1 and 0, e.g., between −0.8 and 0, e.g., −0.8, −0.7, −0.6, −0.5, −0.4, −0.3, −0.2, or −0.1. NPR foams can have an isotropic Poisson's ratio (e.g., Poisson's ratio is the same in all directions) or an anisotropic Poisson's ratio (e.g., Poisson's ratio when the foam is strained in one direction differs from Poisson's ratio when the foam is strained in a different direction).

An NPR foam can be polydisperse (e.g., the cells of the foam are not all of the same size) and disordered (e.g., the cells of the foam are randomly arranged, as opposed to being arranged in a regular lattice). An NPR foam can have a characteristic dimension (e.g., the size of a representative cell, such as the width of the cell from one wall to the opposing wall) ranging from 0.1 µm to about 3 mm, e.g., about 0.1 µm, about 0.5 µm, about 1 µm, about 10 µm, about 50 µm, about 100 µm, about 500 µm, about 1 mm, about 2 mm, or about 3 mm.

In some examples, NPR foams are produced by transformation of PPR foams to change the structure of the foam into a structure that exhibits a negative Poisson's ratio. In some examples, NPR foams are produced by transformation of nanostructured or microstructured PPR materials, such as nanospheres, microspheres, nanotubes, microtubes, or other nano- or micro-structured materials, into a foam structure that exhibits a negative Poisson's ratio. The transformation of a PPR foam or a nanostructured or microstructured material into an NPR foam can involve thermal treatment (e.g., heating, cooling, or both), application of pressure, or a combination thereof. In some examples, PPR materials, such as PPR foams or nanostructured or microstructured PPR materials, are transformed into NPR materials by chemical processes, e.g., by using glue. In some examples, NPR materials are fabricated using micromachining or lithographic techniques, e.g., by laser micromachining or lithographic patterning of thin layes of material. In some examples, NPR materials are fabricated by additive manufacturing (e.g., three-dimensional (3D) printing) techniques, such as stereolithography, selective laser sintering, or other appropriate additive manufacturing technique.

In an example, a PPR thermoplastic foam, such as an elastomeric silicone film, can be transformed into an NPR foam by compressing the PPR foam, heating the compressed foam to a temperature above its softening point, and cooling the compressed foam. In an example, a PPR foam composed of a ductile metal can be transformed into an NPR foam by uniaxially compressing the PPR foam until the foam yields, followed by uniaxially compression in other directions.

In some examples, NPR foams are produced by transformation of PPR foams to change the structure of the foam into a structure that exhibits a negative Poisson's ratio. In some examples, NPR foams are produced by transformation of nanostructured or microstructured PPR materials, such as nanospheres, microspheres, nanotubes, microtubes, or other nano- or micro-structured materials, into a foam structure that exhibits a negative Poisson's ratio. The transformation of a PPR foam or a nanostructured or microstructured material into an NPR foam can involve thermal treatment (e.g., heating, cooling, or both), application of pressure, or a combination thereof. In some examples, PPR materials, such as PPR foams or nanostructured or microstructured PPR materials, are transformed into NPR materials by chemical processes, e.g., by using glue. In some examples, NPR materials are fabricated using micromachining or lithographic techniques, e.g., by laser micromachining or lithographic patterning of thin layes of material. In some examples, NPR materials are fabricated by additive manufacturing (e.g., three-dimensional (3D) printing) techniques, such as stereolithography, selective laser sintering, or other appropriate additive manufacturing technique.

In an example, a PPR thermoplastic foam, such as an elastomeric silicone film, can be transformed into an NPR foam by compressing the PPR foam, heating the compressed foam to a temperature above its softening point, and cooling the compressed foam. In an example, a PPR foam composed of a ductile metal can be transformed into an NPR foam by uniaxially compressing the PPR foam until the foam yields, followed by uniaxially compression in other directions.

NPR-PPR composite materials are composites that include both regions of NPR material and regions of PPR material. NPR-PPR composite materials can be laminar composites, matrix composites (e.g., metal matrix composites, polymer matrix composites, or ceramic matrix composites), particulate reinforced composites, fiber reinforced composites, or other types of composite materials. In some examples, the NPR material is the matrix phase of the composite and the PPR material is the reinforcement phase, e.g., the particulate phase or fiber phase. In some examples, the PPR material is the matrix phase of the composite and the NPR material is the reinforcement phase.

The compressibility of a racquet affects the elastic deformation (e.g., compression) experienced by the racquet when it strikes, e.g., a ball. A suitable amount of deformation enables efficient energy transfer from the racquet to the ball. A racquet that is rigid will have little to no deformation when struck, preventing significant energy transfer to the ball and causing the ball to have a short launching distance. A highly elastic racquet will have a large amount deformation when struck, absorbing significant energy and undergoing a change in its aerodynamic structure, which can also result in a short launching distance. To design a racquet that is capable of launching a ball a desirable distance, the material of the racquet can be selected to balance rigidity and elasticity.

NPR materials can exhibit various desirable properties, including high shear modulus, effective energy absorption, and high toughness (e.g., high resistance to indentation, high fracture toughness), among others. The energy absorption characteristics of NPR materials are such that when a racquet formed at least partially of an NPR material (an "NPR racquet") strikes a ball, the racquet undergoes a different (e.g., smaller) change in diameter than a comparable racquet formed of PPR material (a "PPR racquet").

Figure 3:
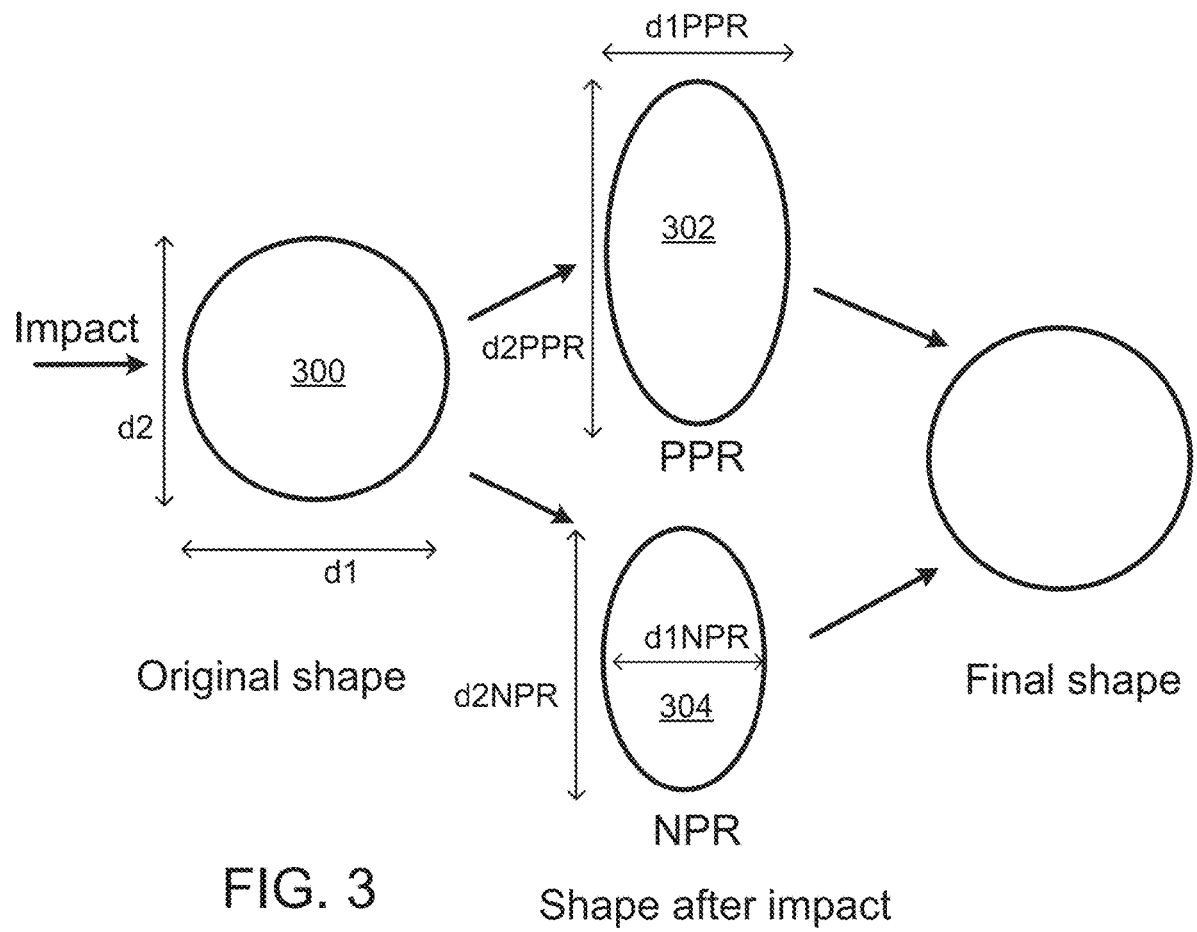
FIG. 3 is an illustration of balls with negative and positive Poisson's ratios.

FIG. 3 shows a schematic depiction of the change in diameter of a material 300 upon impact. Although the material 300 in FIG. 3 is shown as a rounded ball, a similar deformation occurs in materials of other shapes. Prior to impact, the material 300 has a diameter d1 in the direction of the impact and a diameter d2 in the direction perpendicular to the impact. If the material 300 is a PPR material, the material undergoes significant deformation (e.g., elastic deformation) into a shape 302, such that the diameter in the direction of the impact decreases to d1PPR and the diameter in the direction perpendicular to the impact increases to d2PPR. By contrast, if the material 300 is an NPR material, the material undergoes less extensive deformation into a shape 304. The diameter of the shape 304 in the direction of the impact decreases to d1NPR, which is approximately the same as d1PPR. However, the diameter of the shape 304 in the direction perpendicular to the impact also decrease, to d2NPR. The magnitude of the difference between d2 and d2NPR is less than the magnitude of the difference between d2 and d2PPR, meaning that the NPR material undergoes less deformation than the PPR ball. This reduction in total deformation that is achievable by an NPR material enables the NPR material to have a different (e.g., longer) launching distance than an otherwise comparable PPR material at least in part because the NPR material has a lower wind resistance due to its smaller diameter upon compression.

Figure 4B:
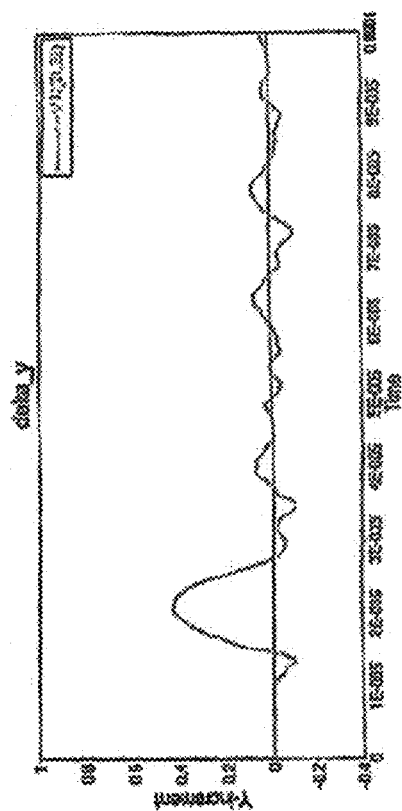
FIGS. 4A and 4B are plots of diameter versus time.
Figure 4A:
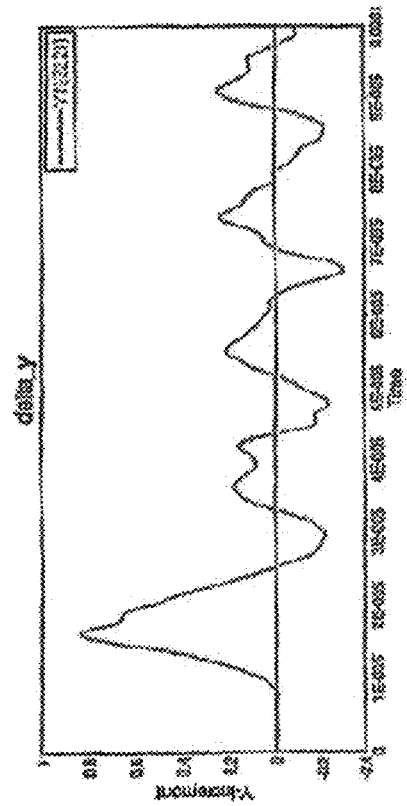

FIGS. 4A and 4B show plots of diameter versus time for a substantially spherical PPR material with a Poisson's ratio of 0.45 and an NPR material with a Poisson's ratio of −0.45, respectively, responsive to being struck with an equivalent force. In this example, the NPR material undergoes a smaller initial change in diameter than does the PPR material, and the oscillations in diameter are smaller in magnitude and dampen more quickly. Again, although FIGS. 4A and 4B are specific to substantially spherical materials, a similar behavior occurs in NPR and PPR materials of other shapes.

Figure 5:
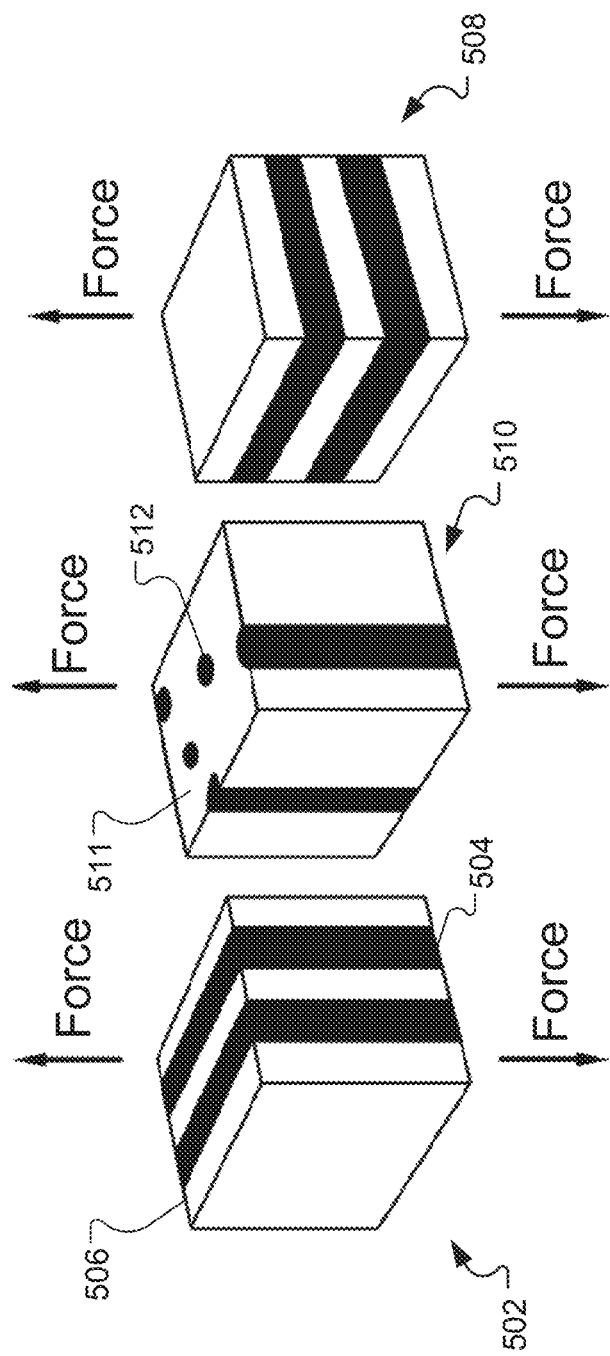
FIG. 5 is an illustration of composite materials.

FIG. 5 illustrates examples of NPR-PPR composite materials. An NPR-PPR composite material 502 is a laminar composite including alternating layers 504 of NPR material and layers 506 of PPR material. The layers 504, 506 are arranged in parallel to a force to be exerted on the composite material 502. Although the layers 504, 506 are shown as having equal width, in some examples, a laminar composite can have layers of different widths.

An NPR-PPR composite material 508 is a laminar composite including alternating layers of NPR material and PPR material, with the layers arranged perpendicular to a force to be exerted on the material 508. In some examples, the layers of a laminar composite are arranged at an angle to the expected force that is neither perpendicular nor parallel.

An NPR-PPR composite material 512 is a matrix composite including a matrix phase 511 of NPR material with a reinforcement phase 512 of PPR material. In the material 512, the reinforcement phase 512 includes fibers of the PPR material; in some examples, the reinforcement phase 512 can include particles or other configuration. In some examples, NPR-PPR composite materials can have a matrix phase of a PPR material with a reinforcement phase of an NPR material.

Figure 6:
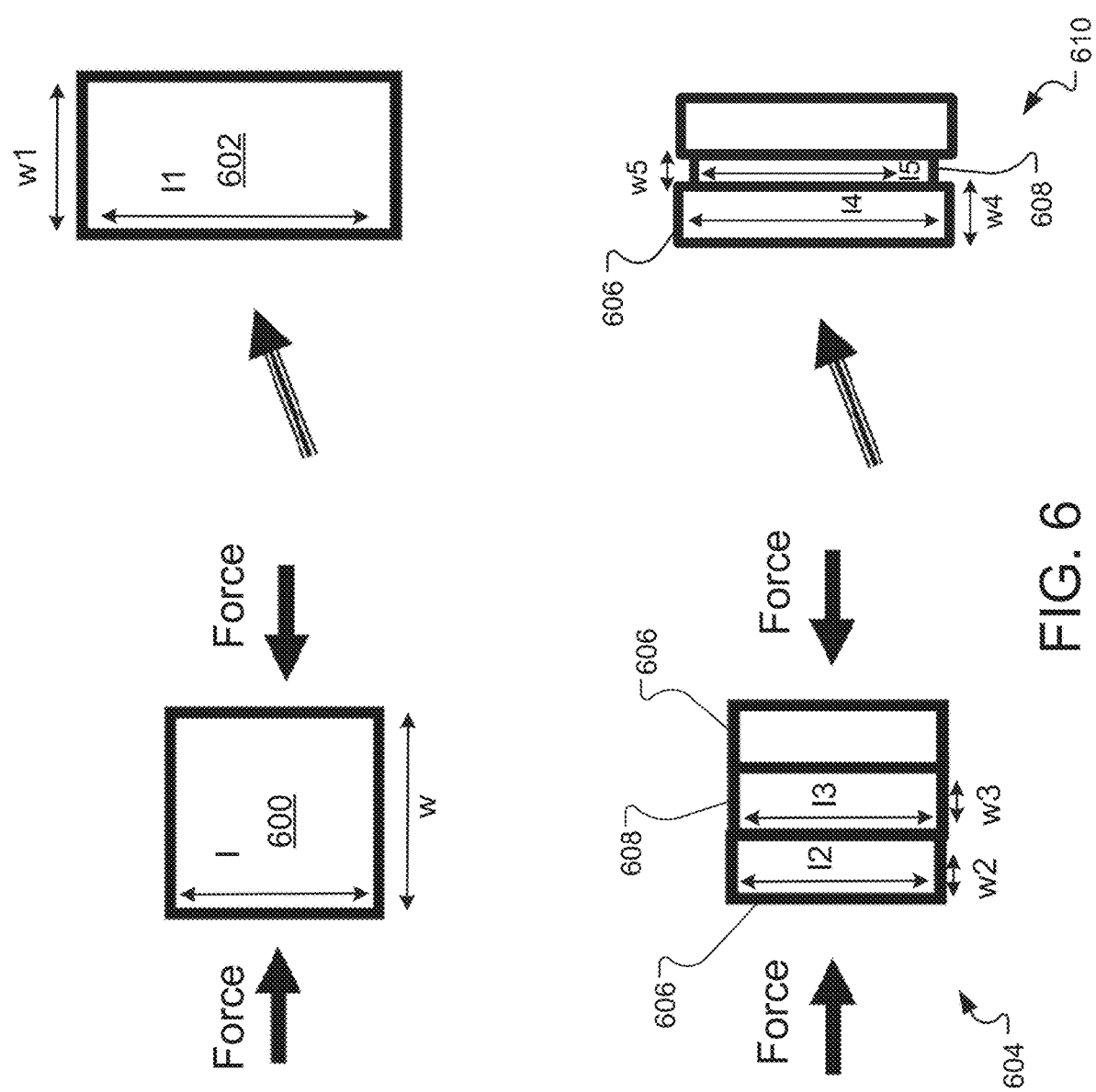
FIG. 6 is an illustration of a material with a positive Poisson's ratio and a composite material.

FIG. 6 illustrates the mechanical behavior of PPR and NPR/PPR composite materials. A hypothetical block 600 of PPR material, when compressed along its width w, deforms into a shape 602. The width w1 of the compressed block 602 is less than the width w of the uncompressed block 600, and the length l1 of the compressed block 602 is greater than the length l of the uncompressed block: the material compresses along the axis to which the compressive force is applied and expands along a perpendicular axis.

A block 604 of NPR/PPR composite material includes a region 608 of NPR material sandwiched between two regions 606 of PPR material. When the block 604 of composite material is compressed along its width, the material deforms into a shape 610. The PPR regions 606 compress along the axis of compression and expand along a perpendicular axis, e.g., as described above for the block 600 of PPR material, such that, e.g., the width w2 of a region 606 of uncompressed PPR material compresses to a smaller width w4 and the length l2 of the region 606 expands to a greater length l4. In contrast, the NPR region 608 compresses along both the axis of compression and along the perpendicular axis, such that, e.g., both the width w3 and length l3 of the uncompressed NPR region 608 are greater than the width w5 and length l5 of the compressed NPR region 608.

Referring again to FIG. 1, the frame 104 includes dimples 110 which improve the aerodynamic properties of the racquet 100. Dimples are depressions or textural irregularities in a surface. The racquet 100 can have different numbers, shapes, and sizes of dimples 110 to achieve different aerodynamic effects. For example, the racquet can have about 50 dimples, 250 dimples, about 300 dimples, about 400 dimples, 500 dimples, 1000 dimples, etc. In the illustrated example, the dimples 110 on the tennis racquet 100 are elliptical and uniform in dimension. In some examples, the dimples 110 are non-uniform in dimension. In some examples, the dimples 110 are circular, triangular, hexagonal, or any other suitable shape, e.g., a shape that impacts the aerodynamic properties of the racquet. The dimples 110 can be generally uniformly spaced or irregularly spaced. In some examples, the dimples do not have sharp corners in order to reduce or minimize stress concentrations. In the example of FIG. 1, the dimples 110 are used in conjunction with NPR materials; in some examples, a racquet formed entirely of PPR material can include dimples.

As tennis players hit balls increasingly fast, the air resistance or drag by the tennis racquet becomes significant. The turbulent flow (vortex) tripping or shedding of air about a dimpled tennis racquet in flight allows the dimpled tennis racquet to travel faster than a smooth, but otherwise comparable, racquet. Dimples on racquets, e.g., on the frame, the handle, or both, reduce wind resistance or drag at a higher, turbulence-producing swinging speeds.

The Reynolds number (Re), which is dimensionless, is given as equation (1) for a sphere:

$$R_e = vD\rho/\eta \quad (1)$$

where v and D are the velocity and diameter of a sphere, and ρ and η are the density and viscosity of the medium (e.g., air), respectively. A Re value above 40,000 results in turbulent flow of air around the sphere and thus will benefit a reduced drag coefficient (CD), and therefore an increased swinging speed for a tennis racquet.

A tennis ball also rotates (e.g., spins) as it leaves the racquet. The spin also affects the CD. At zero spin, the CD decreases with increasing ball speed. The CD reduction is much greater below about 27 m/sec ball speed than above this speed. The CD decreases at a certain high Reynolds number, then increases again. Without being bound by theory, this phenomenon is attributed to the vortex shedding effect of the turbulent flow of air. A similar behavior is exhibited by smooth cylinders, e.g., the handle of a tennis racquet, and can be exhibited by other shapes, such as the frame of a tennis racquet. For dimpled spheres, the threshold of reducing CD is about 40,000 Re; for roughened spheres, the threshold is between 60,000 and 100,000 Re; and for smooth spheres, the threshold is about 300,000 Re. These Re values indicate the effectiveness of tripping vortices, dimpled, roughened, and smooth surface, from the most effective to the least: a dimpled sphere will experience less wind resistance than a smooth sphere or a roughened sphere, regardless of dimple size, shape, number, and depth. Beyond these Re values, the CD values reduce significantly.

A reduction in CD above a certain Reynold's number also occurs for cylinders and objects with more complex shapes. Similar to balls, a dimpled shape (e.g., a cylinder) will experience less wind resistance than the same shape that is smooth or roughened, and the CD for these shapes is reduced significantly at lower Re for dimpled shapes than for smooth shapes.

In some examples, portions of a tennis racquet are dimpled so that the dimpled tennis racquet experiences less wind resistance than a similar, but smooth, tennis racquet. As with spheres, the presence of dimples on a tennis racquet causes vortex tripping or shedding, reducing the CD of the tennis racquet. For instance, the presence of dimples on the frame and handle of a tennis racquet can reduce the CD when the Reynold's number of exceeds a threshold, such as 40,000. The reduced drag coefficient, and thus reduced wind resistance, results in a greater impact power with a same hitting force as compared to using a comparable, smooth racquet. This greater power can provide a player with better control. For instance, a player using a dimpled tennis racquet can apply a smaller swinging force, which is easier to control, to transfer the same impact energy to the ball.

In some examples, a dimpled sheet of material, e.g., plastic, metal, ceramic, composite, or other appropriate material, is adhered to a surface of the racquet (e.g., the frame 104 of the racquet) to produce a dimpled surface. The material can be a PPR material, an NPR material, or an NPR-PPR composite material. In some examples, a dimpled surface is produced by mechanical processing, such as shot peening, sand blasting, molding; chemical processing, such as etching; electrical processing, such as electrical discharge machining or electrochemical machining; laser cutting; or other suitable processes. In some examples, a dimpled surface is heat treated to relieve internal stresses accumulated during manufacturing of the surface.

NPR materials can be incorporated into racquets other than tennis racquets, such as badminton racquets, squash racquets, ping pong paddles, or other racquets. The NPR composition of the racquets helps to facilitate a different (e.g., longer) launching distance than, e.g., comparable PPR racquets.

Figures 7A, 7B:
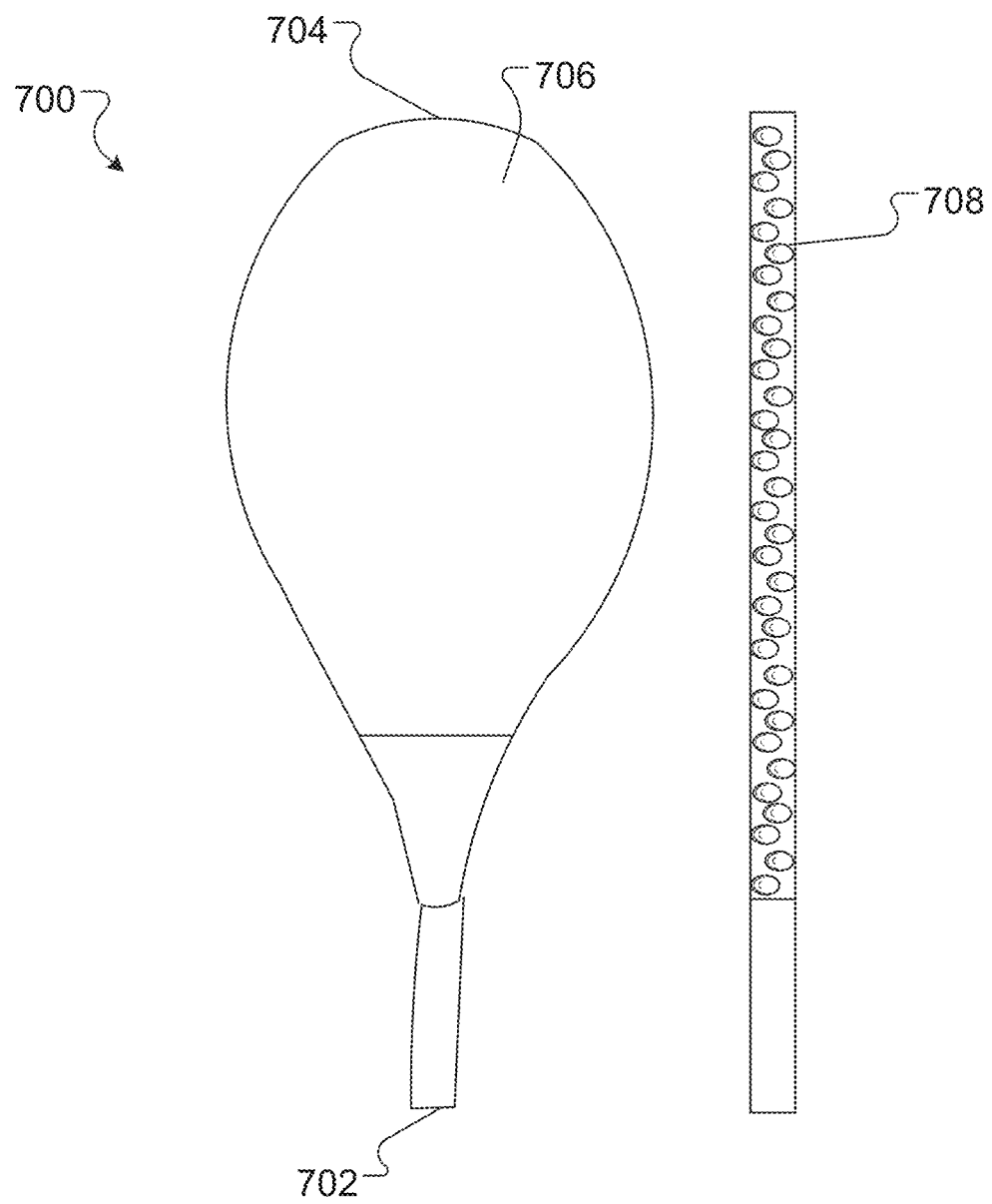
FIGS. 7A and 7B are diagrams of a ping pong paddle.

FIGS. 7A and 7B illustrate a front and side view, respectively, of a ping pong paddle 700 that includes NPR materials. The ping pong paddle 700 includes a handle 702 that can be held in the hand of a user. The handle 702 is attached to a blade 704 that comes into contact with a ping pong ball during a ping pong game. In some examples, the handle 702 and blade 704 are two distinct pieces that are attached together. In some examples, the handle 702 and blade 704 are formed of a single, unitary piece of material. The blade 704 is generally rounded, and can be, e.g., circular, elliptical, etc. Ping pong paddles 700 are generally about 6.7 inches in length and about 5.9 inches in width. The blade 704 is covered with a laminate 706. An NPR material helps to facilitate a different (e.g., longer) launching distance than, e.g., comparable PPR laminates.

One or more parts of the ping pong paddle 700, such as handle 702, blade 704, or laminate 706, include a material with a negative Poisson's ratio (referred to as an "NPR material" or an "auxetic material"), such as an NPR foam material, e.g., an NPR polymer foam an NPR metal foam, or an NPR ceramic foam. As a result, handle 702, blade 704, and/or laminate 706 have a Poisson's ratio of between 0 and −1, e.g., between 0 and −0.8.

Portions of the ping pong paddle 700, e.g., the handle 702, the blade 704, or the laminate 706, can be exclusively NPR material, or can be an NPR-PPR composite material, or can have portions formed of NPR material and portions formed of PPR material. The handle 702 and the blade 704 can include wood, plastic, NPR materials, or combinations thereof. The laminate 706 can include a polymer, rubber, or an NPR material, or combinations thereof. The handle 702 can include the same material as the blade 704 or can include different materials. For example, the handle 702 can be wood and the blade 704 can include an NPR material, or vice versa.

The NPR foam material used for the handle 702, blade 704, and/or laminate 706 can be an NPR rubber foam, such as a foam composed of butadiene, polybutadiene, or styrene-butadiene. The NPR foam material used for the frame 104, handle 102, and/or strings 108 can be an NPR thermoplastic polymer foams (e.g., polyester polyurethane or polyether polyurethane); an NPR viscoelastic elastomer foam; or an NPR thermosetting polymer foam such as silicone rubber. In some examples, the handle 702, blade 704, and/or laminate 706 are composed of an NPR composite material including both an NPR foam material and a PPR material.

The blade 704 includes dimples 708 which improve the aerodynamic properties of the paddle 700. The paddle 700 can have different numbers, shapes, and sizes of dimples to achieve different aerodynamic effects, e.g., similar to dimples 110 on the tennis racquet 100 of FIG. 1. In the illustrated example, the dimples 110 on the paddle 700 are elliptical and uniform in dimension. In some examples, the dimples 708 are non-uniform in dimension. In some examples, the dimples 708 are circular, triangular, hexagonal, or any other suitable shape, e.g., a shape that impacts the aerodynamic properties of the paddle. The dimples 708 can be generally uniformly spaced or irregularly spaced. In some examples, the dimples do not have sharp corners in order to reduce or minimize stress concentrations. In the example of FIG. 7, the dimples 708 are used in conjunction with NPR materials; in some examples, a ping pong paddle formed entirely of PPR materials can include dimples.

Figures 8A, 8B:
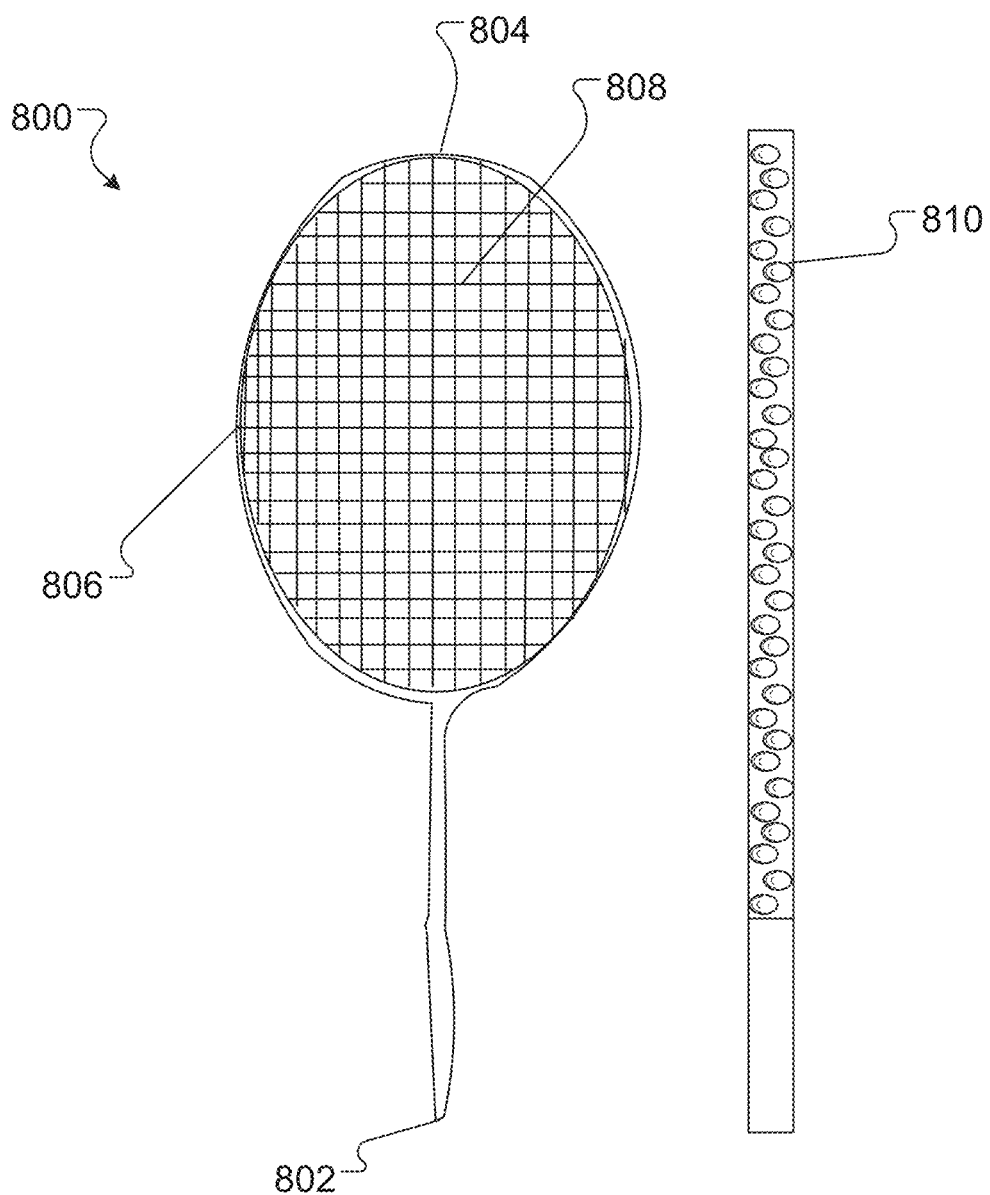
FIGS. 8A and 8B are diagrams of a badminton racquet.

FIGS. 8A and 8B illustrate a badminton racquet 800 that includes NPR materials. The badminton racquet 800 includes a handle 802 that can be held in the hand of a user. An end of the handle 802 is connected to a frame 804. In some examples, the handle 802 and frame 804 are two distinct pieces that are attached together. In some examples, the handle 802 and frame 804 are formed of a single, unitary piece of material. Badminton racquets can come in a variety of sizes (e.g., about 25 inches in length to about 28 inches in length). A standard badminton racquet for an adult is about 27 inches in length.

The frame 804 defines an interior space 806. The interior space 806 is generally rounded, e.g., circular, elliptical, etc. The interior space 806 contains a network of strings 808, which are stretched across the rounded interior space 806. The number of strings 808 stretched across the interior space 806 can vary. The strings 808 make contact with a badminton birdie, and are stretched across the interior space 806 tightly to provide an elastic strike.

One or more parts of the racquet 800, such as the frame 804, the handle 802, or the strings 808, include a material with a negative Poisson's ratio (referred to as an "NPR material" or an "auxetic material"), such as an NPR foam material, e.g., an NPR polymer foam an NPR metal foam, or an NPR ceramic foam. As a result, the frame 804, handle 802, and/or strings 808 have a Poisson's ratio of between 0 and −1, e.g., between 0 and −0.8. The composition of the frame 804, handle 802, and/or strings 808 is similar to that discussed above for the tennis racquet 100.

The frame 804 includes dimples 810 which improve the aerodynamic properties of the racquet 800. The racquet 800 can have different numbers, shapes, and sizes of dimples to achieve different aerodynamic effects, e.g., similar to dimples 110 on tennis racquet 100. The characteristics of the dimples 810 can be similar to the dimples on the tennis racquet 100 described above.

Figures 9A, 9B:
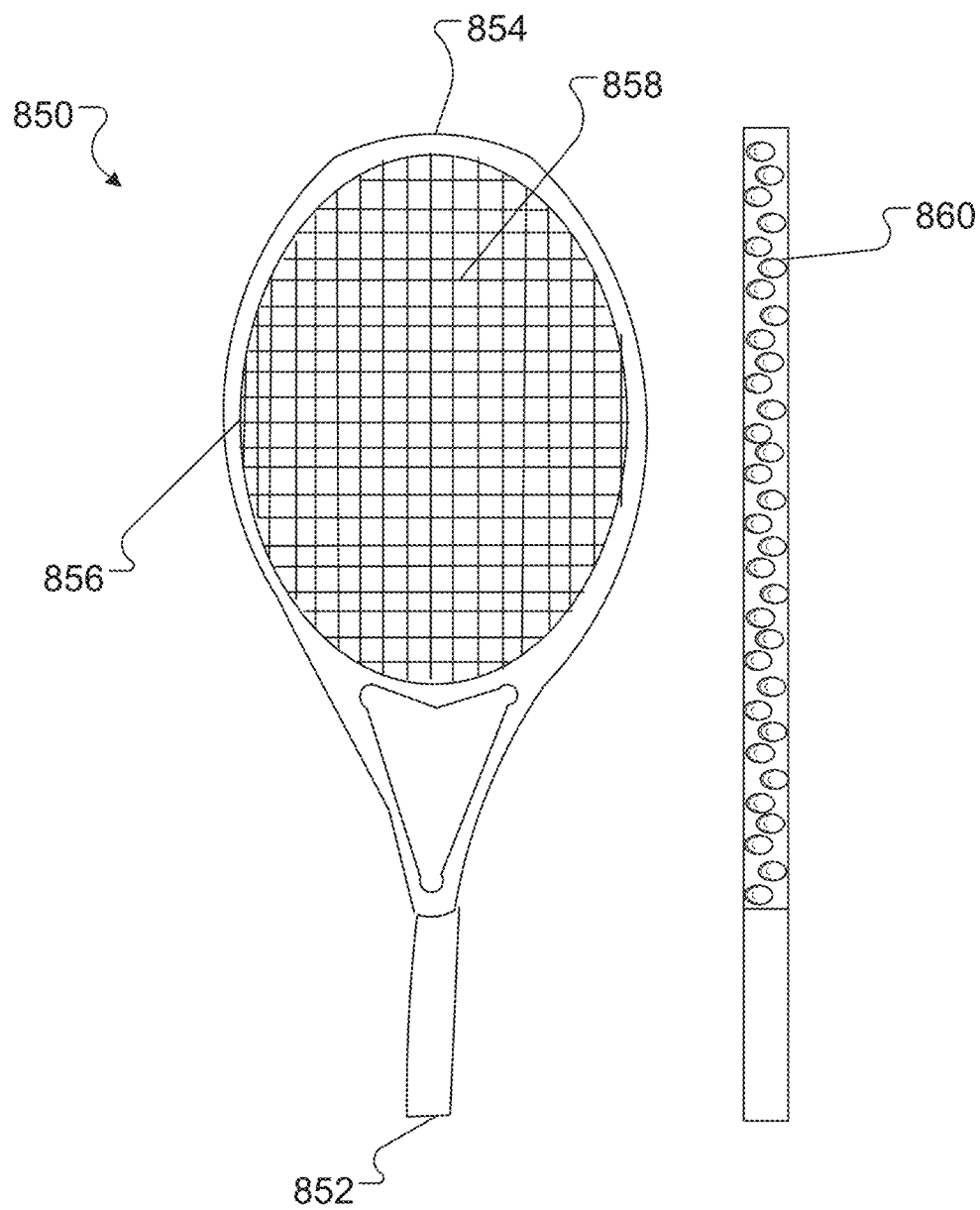
FIGS. 9A and 9B are diagrams of a squash racquet.

FIGS. 9A and 9B illustrate a squash racquet 900 that includes NPR materials. The squahs racquet 900 includes a handle 902 that can be held in the hand of a user. An end of the handle 902 is connected to a frame 904. In some examples, the handle 902 and frame 904 are two distinct pieces that are attached together. In some examples, the handle 902 and frame 904 are formed of a single, unitary piece of material.

The frame 904 defines an interior space 906. The interior space 906 is generally rounded, e.g., circular, elliptical, etc. The interior space 906 contains a network of strings 908, which are stretched across the rounded interior space 906. The number of strings 908 stretched across the interior space 906 can vary. The strings 908 make contact with a badminton birdie, and are stretched across the interior space 906 tightly to provide an elastic strike.

One or more parts of the racquet 900, such as the frame 904, the handle 902, or the strings 908, include a material with a negative Poisson's ratio (referred to as an "NPR material" or an "auxetic material"), such as an NPR foam material, e.g., an NPR polymer foam an NPR metal foam, or an NPR ceramic foam. As a result, the frame 904, handle 902, and/or strings 908 have a Poisson's ratio of between 0 and −1, e.g., between 0 and −0.8. The composition of the frame 904, handle 902, and/or strings 908 is similar to that discussed above for the tennis racquet 100.

The frame 904 includes dimples 910 which improve the aerodynamic properties of the racquet 900. The racquet 900 can have different numbers, shapes, and sizes of dimples to achieve different aerodynamic effects, e.g., similar to dimples 110 on tennis racquet 100. The characteristics of the dimples 910 can be similar to the dimples on the tennis racquet 100 described above.

Figure 10:
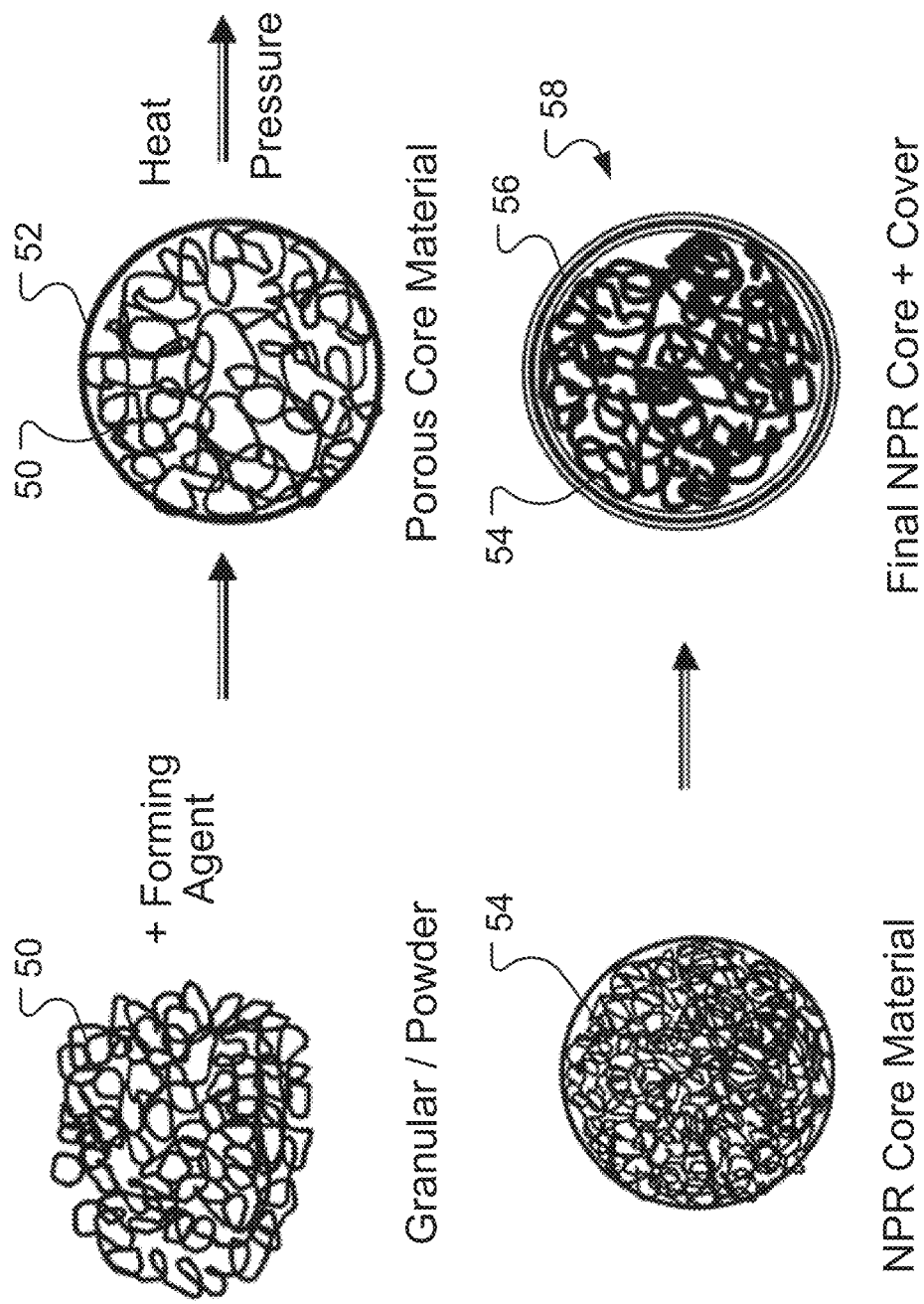
FIG. 10 is a diagram of a method of making an NPR material.

FIG. 10 illustrates an example method of making an object, such as a portion of racquet, formed of an NPR material. A granular or powdered material, such as a polymer material (e.g., a rubber) is mixed with a foaming agent to form a porous material 50. The porous material 50 is placed into a mold 52. Pressure is applied to compress the material 50 and the compressed material is heated to a temperature above its softening point. The material is then allowed to cool, resulting in an NPR foam 54. The NPR foam 54 is covered with an outer layer 56, such as a polymer layer, and heat and pressure is applied again to cure the final material into an object 58.

Other methods can also be used to fabricate an object formed of an NPR material or an NPR-PPR composite material, such as a racquet. For example, various additive manufacturing (e.g., 3D printing) techniques, such as stereolithography, selective laser sintering, or other appropriate additive manufacturing technique, can be implemented to fabricate an object formed of an NPR material or an NPR-PPR composite. In some examples, different components of the object are made by different techniques. For example, the frame of a tennis racquet may be 3D printed while the handle is not, or vice versa. Additive manufacturing techniques can enable seams to be eliminated.

FIGS. 11A-11D illustrate golf tees that can include NPR materials. FIG. 11A illustrates a golf tee 900 with an elongated stem 902. A head 904 is disposed at an end of the elongated stem 902 and has a concave shape to receive a golf ball. The golf tee 900 can include wood, plastic, or an NPR material, or a combination thereof. An NPR golf tee can be fabricated as described above. The composition of the golf tee can be, e.g., as described above for the racquets. For instance, the head 904, stem 902, or both can include an NPR metal foam, an NPR ceramic foam, an NPR polymer foam, or an NPR-PPR composite foam, such that the head 904 and/or stem 902 have a Poisson's ratio of between 0 and −1.

FIG. 11B illustrates a golf tee 920. The golf tee 920 has an elongated stem that is split into two breakaway portions 922 and 924. The golf tee 920 can have more breakaway portions (e.g., three breakaway portions, four breakaway portions). A head 928 is disposed at an end of the elongated stem 902. The head 928 has a concave shape to receive and hold a golf ball. The breakaway portions are releasably held together by magnets 926. When the golf tee is struck during a golf drive, the breakaway portions 922, 924 separate but the golf tee 920 does not break and can be put back together. The golf tee 920 can include wood, plastic, or an NPR material, or a combination thereof.

FIG. 11C illustrates a golf tee 940 that is similar to the golf tee 920. However, the golf tee 940 includes a string 942 connecting the breakaway portions 922, 924 of the elongated stem. When the breakaway portions 922, 924 separate during a golf drive, the string 942 keeps the breakaway portions 922, 924 close together and allows them to be put back together easily.

FIGS. 11D and 11E illustrates a golf tee 960. The golf tee 960 has an elongated stem that includes multiple telescoping portions 962, 964, 966, 968. The telescoping portion 962 extends from the telescoping portion 964, the telescoping portion 964 extends from the telescoping portion 966, and the telescoping portion 966 extends from the telescoping portion 968. The golf tee 960 can have fewer telescoping portions or more telescoping portions (e.g., two telescoping portions, five telescoping portions, etc.). The telescoping portions are used to adjust the height of the golf tee 960 to a player's desired height. For example, in FIG. 11E, the telescoping portions 962 and 964 are extended, but the telescoping portion 966 is not extended. This reduces the height of the golf tee 960. The golf tee 960 includes a head 970 disposed at an end of the telescoping portion 968. The head 970 has a concave shape to receive and hold a golf ball.

Other embodiments are within the scope of the following claims.

What is claimed is:

1. A racquet comprising:
a frame defining a rounded interior space, the frame comprising a negative Poisson's ratio (NPR) portion comprising an NPR foam material, in which the NPR portion has a Poisson's ratio of between 0 and −1, the frame comprising a positive Poisson's ratio (PPR) portion comprising a PPR material, wherein dimples are defined on the frame of the racquet, wherein the dimples are irregularly spaced;
a network of strings stretched across the rounded interior space defined by the frame, the network of strings comprising a PPR material; and
a handle connected to an end of the frame, the handle comprising an NPR-PPR composite material, wherein the NPR-PPR composite material comprises a matrix composite including a matrix phase of NPR material with a reinforcement phase of PPR material including fibers and particles of PPR material.

2. The racquet of claim 1, in which the NPR foam material comprises an NPR polymer foam.

3. The racquet of claim 2, in which the NPR polymer foam comprises an NPR rubber foam.

4. The racquet of claim 2, in which the NPR polymer foam material comprises a thermoplastic polymer NPR foam or a viscoelastic elastomer NPR foam.

5. The racquet of claim 1, in which the NPR foam material comprises an NPR metal foam.

6. The racquet of claim 1, in which the frame has a Poisson's ratio of between 0 and −0.8.

7. The racquet of claim 1, in which the NPR foam material is composed of a cellular structure having a characteristic dimension of between 0.1 μm and 3 mm.

8. The racquet of claim 1, in which the frame comprises a composite material comprising the NPR foam material and a positive Poisson's ratio (PPR) material.

9. The racquet of claim 1, in which the racquet comprises a tennis racquet or squash racquet.

10. The racquet of claim 1, in which the racquet comprises a badminton racquet.

11. The racquet of claim 1, in which the dimples are uniform in dimension.

12. The racquet of claim 1, in which the dimples are non-uniform in dimension.

13. The racquet of claim 1, in which the dimples are hexagonal.

14. The racquet of claim 1, in which the dimples are triangular.

15. A method of making a racquet, the method comprising:
forming a frame of a racquet from a negative Poisson's ratio (NPR) foam material, in which the frame comprises an NPR portion, in which the NPR portion has a Poisson's ratio of between 0 and −1, the frame comprising a positive Poisson's ratio (PPR) portion comprising a PPR material, the forming including forming the frame to define a rounded interior space and to define dimples on the frame, wherein the dimples are irregularly spaced;
stretching a network of strings across the rounded interior space defined by the frame, the network of strings comprising a PPR material, and
in which the frame is connected to an end of a handle of the racquet, the handle comprising an NPR-PPR composite material, wherein the NPR-PPR composite material comprises a matrix composite including a matrix phase of NPR material with a reinforcement phase of PPR material including fibers and particles of PPR material.

16. The method of claim 15, in which forming the frame from an NPR material comprises heating and compressing a positive Poisson's ratio (PPR) foam material to form the NPR material.

17. The method of claim 15 in which forming the frame from an NPR material comprises forming the frame from nano or micro-structured PPR materials.

18. The method of claim 15, in which forming the frame from an NPR material comprises forming the frame using an additive manufacturing technique.

19. A racquet comprising:
a frame defining a rounded interior space, the frame comprising a negative Poisson's ratio (NPR) portion comprising an NPR foam material, in which the NPR portion has a Poisson's ratio of between 0 and −1, the frame comprising a positive Poisson's ratio (PPR) portion comprising a PPR material, wherein dimples are defined on the frame of the racquet, wherein the dimples are irregularly spaced;
a network of strings stretched across the rounded interior space defined by the frame, the network of strings comprising a PPR material; and
a handle connected to an end of the frame, the handle comprising an NPR-PPR composite material, wherein the NPR-PPR composite material comprises a laminar composite including alternating layers of NPR material and layers of PPR material, comprising at least two layers of NPR material and at least two layers of PPR material.

20. The racquet of claim 19, in which the layers of NPR material and the layers of PPR material are equal in thickness.

21. The racquet of claim 19, in which the layers of NPR material and the layers of PPR material have different thicknesses.

22. The racquet of claim 19, in which the NPR foam material comprises an NPR polymer foam.

23. The racquet of claim 22, in which the NPR polymer foam comprises an NPR rubber foam.

24. The racquet of claim 22, in which the NPR polymer foam material comprises a thermoplastic polymer NPR foam or a viscoelastic elastomer NPR foam.

25. The racquet of claim 19, in which the NPR foam material comprises an NPR metal foam.

* * * * *